United States Patent
Hu et al.

(10) Patent No.: US 12,470,364 B2
(45) Date of Patent: Nov. 11, 2025

(54) CIRCUITS AND SYSTEMS FOR PROGRAMMABLE IN-MEMORY ENCRYPTION/DECRYPTION FABRIC INCLUDING RA/CAM ARRAYS FOR PARALLEL PROCESSING OF OPERATIONS

(71) Applicant: University of Notre Dame du Lac, South Bend, IN (US)

(72) Inventors: Xiaobo Sharon Hu, South Bend, IN (US); Dayane Alfenas Reis, South Bend, IN (US); Michael Niemier, South Bend, IN (US); Haoran Geng, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 151 days.

(21) Appl. No.: 18/317,130

(22) Filed: May 15, 2023

(65) Prior Publication Data

US 2023/0379140 A1    Nov. 23, 2023

Related U.S. Application Data

(60) Provisional application No. 63/365,020, filed on May 19, 2022.

(51) Int. Cl.
*H04L 9/00* (2022.01)
*H04L 9/06* (2006.01)

(52) U.S. Cl.
CPC ................................. *H04L 9/0631* (2013.01)

(58) Field of Classification Search
CPC ........................... H04L 9/0631; H04L 9/0643
See application file for complete search history.

(56) References Cited

U.S. PATENT DOCUMENTS

2015/0278555 A1* 10/2015 Melzani ................. H04L 9/002
                                                                 713/192
2021/0134366 A1*  5/2021 Irfan ...................... G11C 15/04

OTHER PUBLICATIONS

J. Daemen et al., "AES Proposal: Rijndael," The Rijndael Block Cipher, pp. 1-45, 1999.
K. Stevens et al., "Single-chip FPGA Implementation of a Pipelined, Memory-Based AES Rijndael Encryption Design," CCECE, pp. 1296-1299, 2005.
R. Chaves, et al., "Reconfigurable Memory Based AES Co-Processor," IEEE, pp. 1-8, 2006.
R. Ueno, et al., "High Throughput/Gate AES Hardware Architectures Based on Datapath Compression," IEEE Trans Comput., vol. 69, No. 4, pp. 534-548, 2020.

(Continued)

*Primary Examiner* — Syed M Ahsan
(74) *Attorney, Agent, or Firm* — Stanek Lemon Crouse & Meeks, PA

(57) ABSTRACT

A secure system configured to perform operations on data can include a plurality of N look-up-table fabric modules each operatively coupled to a respective column of M rows of data included in an input state matrix having N columns and M rows and a processor circuit operatively coupled to the plurality of N look-up-table fabric modules, the processor circuit configured to provide unencrypted data to the plurality of N look-up-table fabric modules for encryption and configured to provide encrypted data to the plurality of N look-up-table fabric modules for decryption.

17 Claims, 9 Drawing Sheets

(56) References Cited

OTHER PUBLICATIONS

G. Sayilar et al., "Cryptoraptor: High Throughput Reconfigurable Cryptographic Processor," ICCAD, pp. 1-8, 2014.
Y. Zhang, et al., "Recryptor: A Reconfigurable Cryptographic Cortex-M0 Processor With In-Memory and Near-Memory Computing for IoT Security," IEEE J. Solid-State Circuits, vol. 53, No. 4, pp. 995-1005, 2018.
M. Xie, et al., "Securing Emerging Non-volatile Main Memory with Fast and Energy-Efficient AES In-Memory Implementation," IEEE Transactions on Very Large Scale Integration (VLSI) Systems, pp. 1-13, 2018.
S. Yu et al., "Emerging Memory Technologies: Recent Trends and Prospects," IEEE Solid-State Circuits Magazine, vol. 8, pp. 43-56, 2016.
Hua Li, "A New CAM Based $S/S^{-1}$/-Box Look-up Table in AES," ISCAS, vol. 5, pp. 4634-4636, 2005.
S. K. Mathew et al., "53 Gbps Native $GF(2^4)^2$ Composite-Field AES-Encrypt/Decrypt Accelerator for Content-Protection in 45 nm High-Performance Microprocessors," IEEE J. Solid-State Circuits, vol. 46, pp. 767-776, 2011.
J. Wolkerstorfer et al., "An ASIC Implementation of the AES SBoxes," in Topics in Cryptology—CT-RSA 2002, B. Preneel Ed., Springer Berlin Heidelberg, pp. 67-78, 2002.

* cited by examiner

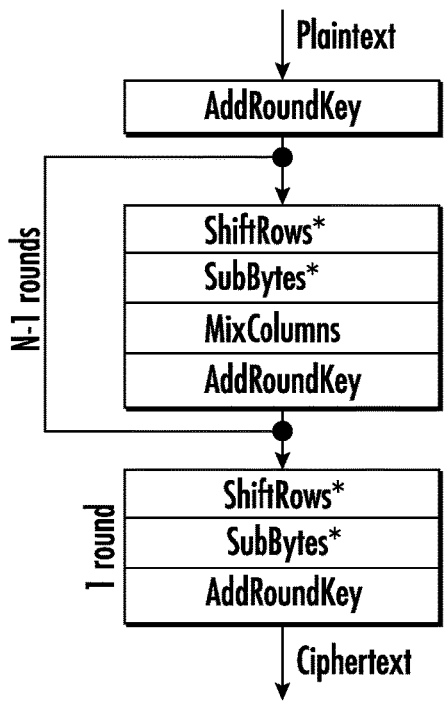
FIG. 1A
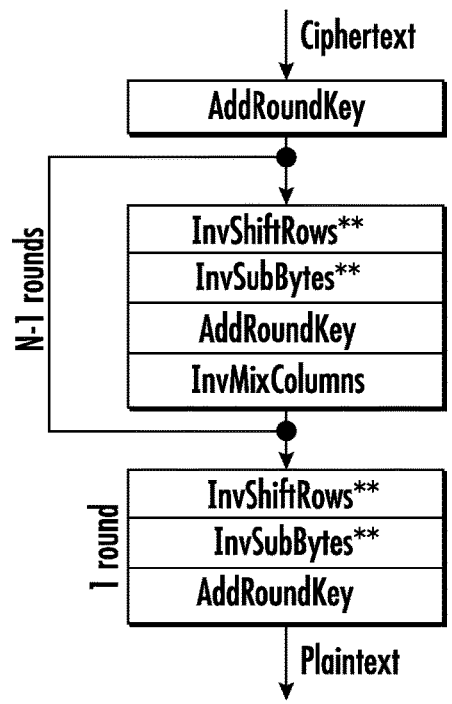
FIG. 1B
FIG. 2A
FIG. 2B

CIRCUITS AND SYSTEMS FOR PROGRAMMABLE IN-MEMORY ENCRYPTION/DECRYPTION FABRIC INCLUDING RA/CAM ARRAYS FOR PARALLEL PROCESSING OF OPERATIONS

CLAIM FOR PRIORITY

The present application claims priority to U.S. Provisional Application Ser. No. 63/365,020, titled IMCRYPTO: AN IN-MEMORY COMPUTING FABRIC FOR AES ENCRYPTION AND DECRYPTION, filed in the USPTO on May 19, 2022, the entire disclosure of which is hereby incorporated herein by reference.

STATEMENT OF GOVERNMENT SUPPORT

This invention was made with government support under Grant No. HR0011-18-3-0004 awarded by the Department of Defense/Defense Advanced Research Projects Agency (DARPA). The government has certain rights in the invention.

FIELD

The present inventive concept relates to the field of encryption in general and, more particularly, to electronic memory systems for encryption.

BACKGROUND

Advance encryption standard (AES) is an encryption method used in a variety of computer systems. Despite the excellent security of AES, its software-based implementations can be computationally expensive, resulting in low throughput. Hardware accelerators designed for AES encryption/decryption can achieve high throughput while enabling area-efficient design alternatives for resource-constrained environments, such as edge computing. AES hardware accelerators are usually application-specific integrated circuits (ASICs) or field-programmable gate array (FPGA)-based coprocessors that implement the operations for the AES algorithm, i.e., AddRoundKey, SubBytes/InvSubBytes, ShiftRows, and Mix-Columns/InvMixColumns.

The core functions in AES involve mainly simple operations, which makes AES encryption/decryption memory bound. To address the memory bottleneck of AES, in-memory computing (IMC) architectures (i.e., with modified memory cells or peripherals) may be designed to perform operations commonly found in AES-based encryption/decryption (e.g., bit shifts, byte permutations, and XOR). IMC-based architectures operate on memory words without the need for data transfers to a processing unit. Despite the potential for reduced data traffic, work in must make tradeoffs between area/power efficiency and parallelism. To this end, accelerators based on the lookup table (LUT) and precomputed operations have demonstrated high levels of parallelism and throughput. In this regard, memories based on emerging technologies (e.g., phase-change memories (PCMs), resistive random-access memories (RRAMs), spin-transfer torque magnetoresistive random access memories (STT-MRAMs), and ferroelectric field-effect transistor-based random access memories (FeFET-RAMs)] can considerably improve the density and static power consumption of IMC architectures (albeit at the expense of longer write latencies).

SUMMARY

Embodiments according to the present inventive concept can provide circuits and systems for programmable in-memory encryption/decryption fabric including RAM/CAM arrays for parallel processing. Pursuant to these embodiments, a secure system configured to perform operations on data can include a plurality of N look-up-table fabric modules each operatively coupled to a respective column of M rows of data included in an input state matrix having N columns and M rows and a processor circuit operatively coupled to the plurality of N look-up-table fabric modules, the processor circuit configured to provide unencrypted data to the plurality of N look-up-table fabric modules for encryption and configured to provide encrypted data to the plurality of N look-up-table fabric modules for decryption. Other aspects are also described herein.

BRIEF DESCRIPTION OF THE DRAWINGS

Throughout the drawings, reference numbers can be re-used to indicate correspondence between referenced elements. The drawings are provided to illustrate embodiments of the present disclosure and do not to limit the scope thereof.

FIG. 1A is a flowchart illustrating operations performed in the N rounds of AES encryption, wherein the values of N are 10 (for AES-128), 12 (for AES-192), and 14 (for AES-256) and the ShiftRows and SubBytes are commutative operations in accordance with some embodiments of the present disclosure.

FIG. 1B is a flowchart illustrating operations performed in the N rounds of AES en-decryption, wherein the values of N are 10 (for AES-128), 12 (for AES-192), and 14 (for AES-256) and the InvShiftRows and InvSubBytes are commutative operations in accordance with some embodiments of the present disclosure.

FIG. 2A illustrates MixColumns operations of AES-based encryption in accordance with some embodiments of the present disclosure.

FIG. 2B illustrates InvMixColumns operations of AES-based decryption in accordance with some embodiments of the present disclosure.

DETAILED DESCRIPTION OF EMBODIMENTS ACCORDING TO THE INVENTIVE CONCEPT

Figure 3:
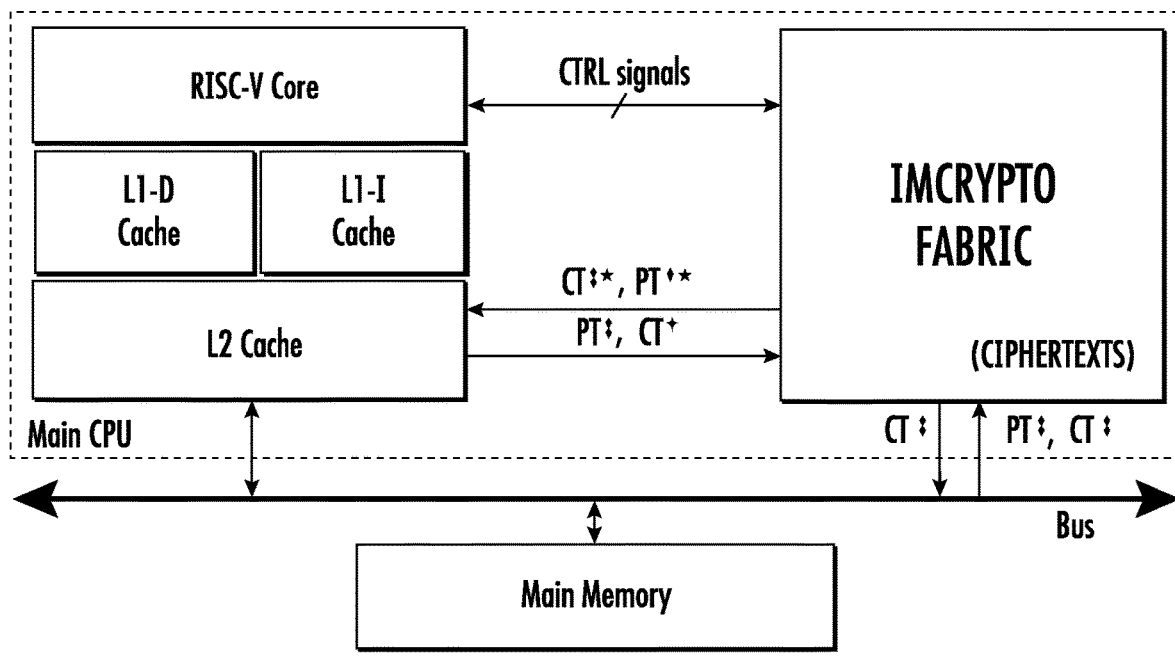
FIG. 3 is a block diagram illustrating and overview of an IMCRYPTO-based system in accordance with some embodiments of the present disclosure.

Embodiments according to the inventive concept can provide a programmable In-Memory Computing (IMC) fabric for acceleration of encryption/decryption operations (sometimes referred to herein as "IMCRYPTO") that achieves the same parallelism as LUT methods while avoiding large area/power overheads. In some embodiments, IMCRYPTO can combine both conventional and compute-enabled random access memory (RAM) arrays, as well as dual-function random access/content addressable memory (RA/CAM) arrays. Specifically, the RA/CAM arrays employed in IMCRYPTO enable encryption and decryption to be performed with a common structure. To improve the computational efficiency, the operations SubByte/MixColumns (for encryption) and InvSubBytes/AddRoundKey/InvMixColumns (for decryption) are combined and executed in one operation with our design. The proposed fabric supports pipelining and enables high-throughput execution. The contributions of our work are summarized as follows.

As described further herein, embodiments according to the present inventive concept can provide a highly parallel IMC fabric based on RAM and RA/CAM arrays that provide high-throughput AES encryption/decryption with a common hardware structure. Further, embodiments according to the present inventive concept can provide a compact implementation of the AES operations, which can combine certain operations in encryption (and decryption) to reduce computation load. Still further, embodiments according to the present inventive concept can provide an RISC-V-based controller that implements customized instructions for flexibility that enables multiple modes of AES and other block ciphers to be implemented.

As further described herein, we have performed detailed circuit-level, simulation-based evaluations of the disclosed IMCRYPTO architecture. We consider figures of merit (FoM), such as delay, area, power, throughput, area-delay-power product (ADPP), and throughput per area, and compare them with state-of-the-art ASIC and IMC-based accelerators for AES encryption. Results indicate minimum (maximum) throughput per area improvements of 3.3× (223.1×) and minimum (maximum) ADPP improvements of 1.2× (6238.3×) for CMOS-based IMCRYPTO compared to ASIC and IMC accelerators for AES-128 encryption of a 1-MB plaintext (PT). (The wide spectrum of improvement is a result of different circuit and design paradigms employed in each accelerator.) IMCRYPTO can also leverage emerging memory technologies to further boost the ADPP improvements over a conventional CMOS-based implementation. Analysis suggests that employing emerging technologies in the design of memory units in IMCRYPTO could improve the ADPP by an additional factor of up to 5.3×.

II. Basics of AES Encryption/Decryption

A. AES Basics

FIGS. 1A and B illustrate the operations performed in N rounds of AES encryption and decryption. As a variant of the Rijndael block cipher, AES employs a fixed block size of 128 bits and a key size of 128, 192, or 256 bits (for AES-128, AES-192, or AES-256, respectively). Round keys are derived from the main key for each one of the N rounds using a key schedule algorithm.

The 128-bit block is arranged as a 4×4 array of bytes, which is the state array. Each operation in the AES encryption (decryption) takes a state array as an input and produces an output state array that is passed to the next operation (or returned as the final encryption or decryption result at the end of N rounds). We represent elements of the input (output) state array as $a_{i,j}$ ($b_{i,j}$), where i=0, 1, 2, 3 and j=0, 1, 2, 3. The operations of AES encryption (decryption) are summarized in the following.

1.) AddRoundKey: In the AddRoundKey operation, every byte of a round key rk is combined to the corresponding byte of the input state through an XOR operation, i.e., $b_{i,j}= a_{i,j} \oplus rk_{i,j}$.

2.) SubBytes and InvSubBytes: During SubBytes and InvSubBytes, each byte $a_{i,j}$ in the input state array is replaced by a substitution byte to form the output state array, i.e., $b_{i,j}=Sbox(a_{i,j})$. Since each byte $a_{i,j}$ in the 0x00-0xFF interval maps to a unique substitution byte, encryption/decryption Sbox tables can be precomputed and stored in memory to improve the speed of AES.

3.) ShiftRows and InvShiftRows: During ShiftRows and InvShiftRows, the bytes of the input state array are circularly shifted to the left (right) by a fixed offset amount (zero, one, two, or three positions) depending on the index i of the byte. The output state is then formed by the byte-shifted input state. For i=0, no circular byte shifts are performed ($b_{i,j}=a_{i,j}$). For i=1, 2, and 3, the offsets of the circular byte shifts are defined as 1, 2, and 3, respectively, with a left (right) direction for encryption (decryption).

4.) MixColumns and InvMixColumns: During MixColumns and InvMixColumns, a linear transformation is applied to the input state matrix to form the output state matrix. This transformation consists of a matrix multiplication over the Galois Field ($GF(2^8)$) between a fixed matrix and the input state matrix (see FIG. 2). As with SubBytes (InvSubBytes), it is possible to speed up the MixColumns (InvMixColumns) operations by precomputing the products between every byte value in the range 0x00-0xFF and the multiplication coefficients.

5.) Modes of Operation: Modes of operation ensure confidentiality and authenticity when a cipher's single-block operation encrypts/decrypts an amount of data larger than a 128-bit block. Different modes of operation are commonly used in addition to the basic version of the AES algorithm a.k.a. the electronic code book (ECB). For instance, the CBC, the cipher feedback (CFB), the output feedback (OFB), the CTR, and the GCM are AES modes that require simple operations (such as XOR or addition) to be performed between the state array and randomly generated numbers (or counter values) at the start of every AES round. (For details on different modes of AES and their practical use).

III. IMCRYPTO Fabric

As appreciated by the present inventors, an IMCRYPTO in-memory accelerator disclosed herein can be placed on the same chip as the CPU at the level of the last level cache (LLC). Placing IMCRYPTO on-chip and at the level of the LLC facilitates data exchange with the CPU and creates a mechanism for storing CTs inside IMCRYPTO's internal memory (i.e., IMCRYPTO works as the LLC for secure data). Furthermore, data are properly protected before being sent to the main memory through the memory bus. IMCRYPTO employs a lightweight, general-purpose core to program IMCRYPTO's functionality. For simplicity, an RISC-V core can be used in IMCRYPTO, but other cores can also be designed for this purpose. Due to the programmability enabled by the RISC-V core, IMCRYPTO offers flexibility at the application level.

Note that using IMCRYPTO as the LLC for secure data may not significantly impact the performance of the main CPU for executing nonsecure workloads since the L1/L2 caches can have their content accessed directly by the RISC-V core without going through IMCRYPTO. Furthermore, with IMCRYPTO working simultaneously as an accelerator for AES encryption/decryption and the LLC for secure data, the L1 and L2 caches (represented in FIG. 3) can be reserved for the storage of non sensitive data. Thus, data can be freely transferred from/to the main memory through the bus and from/to the RISC-V core without any negative impact on the security.

FIG. 3 provides an overview of the IMCRYPTO-based system, where the interaction between IMCRYPTO and the other components of a computer system (i.e., the main memory and L1/L2 caches) is explicitly shown. Encryption/decryption requests to IMCRYPTO can be made by the RISC-V core, which communicates with IMCRYPTO through a set of control (CTRL) signals. The RISC-V uses the customized instruction "TEXT" (as described in Section III-D and Table I) to pass the address of a PT or a CT for encryption/decryption with IMCRYPTO. Round keys are generated on the fly by the RISC-V core and directly provided to IMCRYPTO. In the following, we describe how in some embodiments, IMCRYPTO processes encryption/decryption requests can be made by the RISC-V core.

TABLE 1A

| Instruction | Function Code | | Assembly | Description |
| --- | --- | --- | --- | --- |
| | Bits 1-7 | Bit 8 | | |
| TEXT | L | 0000000 | 0 | TEXT address, s1 | Load 128 bits from IMCRYPTO to RISC-V registers during decryption |
| | S | | 1 | TEXT s1, address | Store 128 bits to IMCRYPTO from RISC-V registers during encryption |
| SFTR | E | 0000100 | 0 | SFTR s1 | Trigger ShiftRows on s1 (encryption) |
| | D | | 1 | SFTR s1 | Trigger InvShiftRows on s1 (decryption) |
| SUBMX | E | 0001000 | 0 | SUBMX s1 | Trigger combined SubBytes + MixColumns (encryption) on s1 |
| | D | | 1 | SUBMX s1 | Trigger combined InvSubBytes + InvMixColumns (decryption) on s1 |
| SBOX | E | 0010000 | 0 | SBOX s1 | Trigger SubBytes (last round of encryption) on s1 |
| | D | | 1 | SBOX s1 | Trigger InvSubBytes (last round of decryption) on s1 |

1) At encryption, the instruction "TEXT" is used to pass the data address of a PT to IMCRYPTO. The PT is fetched to (and temporarily stored in) the internal memory of IMCRYPTO from either the L2 cache (in case of a cache hit) or the main memory (in case of a cache miss). After the data transfer process, the PT is encrypted by the IMC infrastructure in IMCRYPTO, generating a CT. Once encryption finishes, the resulting CT replaces the initial PT in the internal memory of IMCRYPTO, where it is stored for future use by the RISC-V core (i.e., IMCRYPTO works as the LLC for secure data). Once the capacity of the IMCRYPTO's memory is reached (or if there are conflict misses), selected CTs are transferred to the main memory via the bus.

TABLE 1B

| Instruction | Bits 1-7 | Bits 8-10 | Assembly | Description |
|---|---|---|---|---|
| | | Function Code | | |
| IMMOVE | 0000000 | 000 | IMMOVE s1, sd | Move data in memory from address s1 to sd |
| IMADD | 0000000 | 001 | IMADD s1, s2, sd | Store the value of s1 + s2 into sd |
| IMAND | 0000000 | 010 | IMAND s1, s2, sd | Store the value of s1 AND s2 into sd |
| IMOR | 0000000 | 011 | IMOR s1, s2, sd | Store the value of s1 OR s2 into sd |
| IMXOR | 0000000 | 100 | IMXOR s1, s2, 3d | Store the value of s1 XOR s2 into sd |
| IMNOT | 0000000 | 101 | IMNOT s1, sd | Store the value of $\overline{s1}$ into sd |
| IMCSR | 0000000 | 110 | IMCSR s1, s2, sd | Circular shift of s2 by s1 bits to the right, store result in sd |
| IMSR | 0000000 | 111 | IMSR s1, s2, sd | Shift of s2 by s1 bits to the right, store result in sd |
| IMCSL | 1000000 | 000 | IMCSL s1, s2, sd | Circular shift of s2 by s1 bits to the left, store result in sd |
| IMSL | 1000000 | 001 | IMSL s1, s2, sd | Shift of s2 by s1 bus to the left, store result in sd. |

2) At decryption, the instruction "TEXT" is used to pass the data address of a CT to IMCRYPTO. The CT is fetched to the internal memory of IMCRYPTO from either the L2 cache (in case of a cache hit) or the main memory (in case of a cache miss). After the data transfer process, the CT is decrypted by the IMC infrastructure in IMCRYPTO, generating a PT. Once decryption finishes, the postdecryption PT is not kept in the internal memory of IMCRYPTO (which is reserved for secure data) but rather is transferred to the CPU's L2 cache to be used by processes running on the CPU.

Figures 4A, 4B:
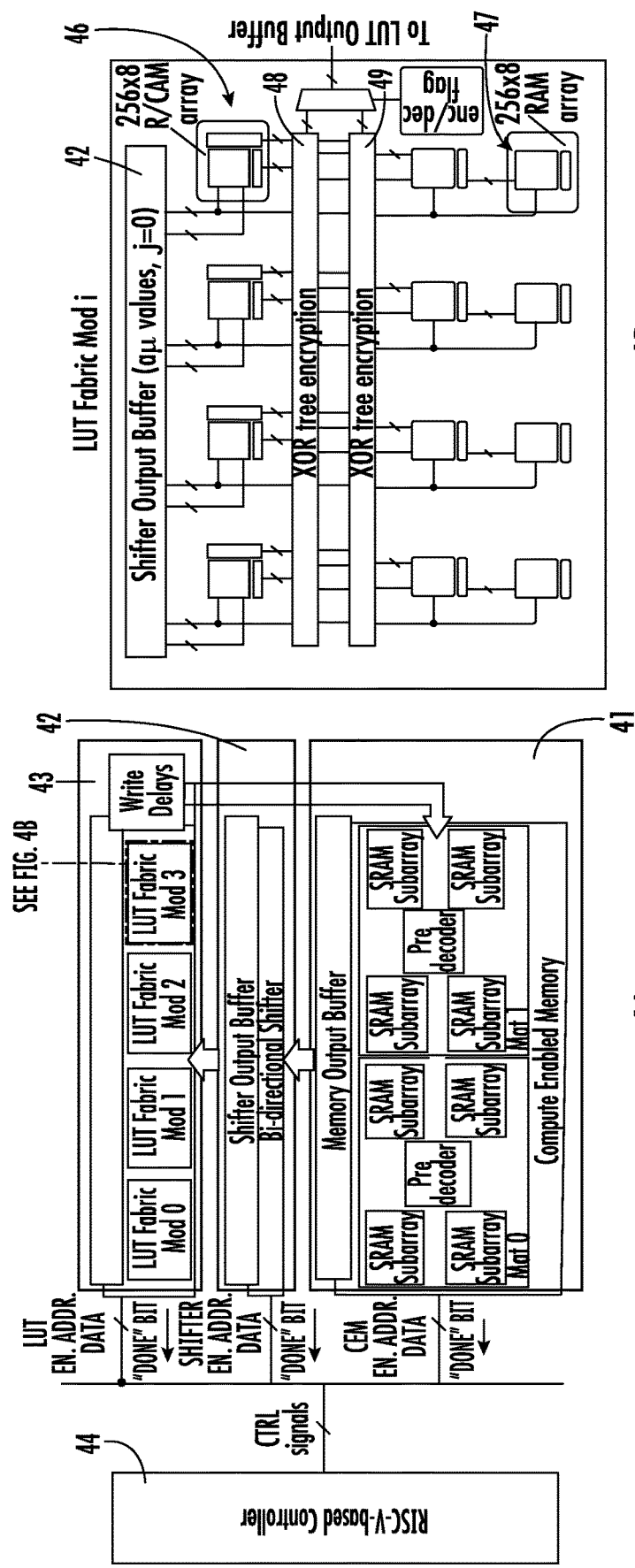
FIG. 4A is a block diagram illustrating high-level view of an IMCRYPTO accelerator in accordance with some embodiments of the present disclosure.
FIG. 4B is a block diagram illustrating details of 1 LUT fabric module circuit included in the IMCRYPTO accelerator of FIG. 4A in accordance with some embodiments of the present disclosure.

The IMCRYPTO fabric, see for example FIG. 4A, includes circuits that may be grouped into four distinct blocks. The blocks, numbered from 1 to 4 in FIG. 4A, are: the compute-enabled memory (CEM) 1 the bidirectional shifter circuit 2, the LUT fabric circuit 3 (comprised of four modules); and the RISC-V-based controller 4.

A. Compute-Enabled Memory

The AddRoundKey operation of AES encryption (decryption) is the addition of a round key to a PT (CT) through a simple XOR operation. To enable the AddRoundKey operation in AES encryption (and in the initial round of AES decryption), the proposed architecture implements the CEM 41 block. The CEM 41 of IMCRYPTO employs circuits i.e., customized sense amplifiers (SAs)—which enables bitwise Boolean logic between two memory words stored in a memory array.

The CEM 41 receives PT from the CPU L2 cache, performs logic operations on the AES state array, and stores the resulting CT after encryption. The encrypted data in IMCRYPTO can be directly read from the CEM 41 by the CPU cache structure and sent to external parties using communication protocols, such as the peer-to-peer (P2P) or attribute-based encryption (ABE) (used in IoT systems). Another usage scenario for direct access to the CEM 41 is when the CPU core performs operations on data that have been previously encrypted and stored in IMCRYPTO. In this case, IMCRYPTO allows for the data to be decrypted prior to sending it to be used by the processes running on the CPU core.

As an on-chip memory, the size of a CEM 41 needs to be within the acceptable limits for a CPU cache (i.e., from tens of KB up to a few MB). A larger CEM 41 enables more CTs to be stored in IMCRYPTO, which can be useful when cached CTs are sent to external parties using communication protocols. On the other hand, bigger memories have longer access times and consume more power. To allow for a compromise between memory size, access times, and energy consumption, the CEM 41 block of IMCRYPTO is a 1-MB memory that consists of a tiled, compute-enabled SRAM structure. With the aid of customized SAs, the CEM 41 can execute XOR operations between two memory words without the need for reading the data out to an external processing unit.

B. Bidirectional Shifter Circuit

The bidirectional shifter circuit 42 performs the byte permutations used by the ShiftRows (InvShiftRows) operations of AES encryption (decryption).

C. LUT Fabric

The LUT fabric module circuit 43 executes the SubBytes/InvSubBytes and MixColumns/InvMixColumns operations of AES. With the use of small memory elements (i.e., 6T-SRAM and RA/CAM arrays of size 256×8) and customized peripherals, it is possible to perform these operations in a highly parallel and combined fashion with low latency. The size of the memory elements (i.e., 256×8) is chosen, so it is possible to store all the possible 256 precomputed bytes of combined SubBytes and MixColumns.

The LUT fabric module circuit 43 block comprises four LUT fabric module circuits 45 that execute one matrix multiplication in GF(28). These four identical LUT fabric modules 45 in the LUT fabric module circuit 43 operate in parallel to compute each column of the output state array (i.e., j=0, 1, 2, 3) in the MixColumns/InvMixColumns and SubBytes/InvSubBytes operations. The internal structure of an LUT fabric module is depicted in FIG. 4B. Each LUT fabric module circuit 45 can include four RA/CAM arrays 46 with customized peripherals; eight RAM arrays 47; and 3) two sets of cascaded XOR gates 48 and 49 [i.e., XOR trees that are employed to perform additions over $GF(2^8)$]. The number of memory elements of each type inside an LUT fabric module circuit 46 allows combined operations to be performed without serializing operations.

D. RISC-V-Based Controller

Encryption and decryption in AES includes certain computational operations performed in a certain order over N rounds (see FIG. 1). Moreover, different modes of AES have different data flows and may require additional operations. IMCRYPTO employs an RISC-V-based controller 44 to perform the different operations of AES and support different modes of operation. In addition, the RISC-V-based controller 44 makes it possible to extend the use of the IMCRYPTO fabric for other cryptographic algorithms that require similar operations as AES.

To support IMCRYPTO operations, eight RV32I I-type [see Table IA] and ten RV32I R-type [see Table IB] customized instructions in the RISC-V instruction set architecture (ISA). Two RV32I I-type instructions are used to load/store from/to IMCRYPTO's CEM 41 (discussed in to/from registers in the RISC-V core. The rest of the I-type instructions are used to trigger each operation in AES encryption/decryption. After decoding these customized I-type instructions, the RISC-V-based controller 44 generates three main inputs to each block of IMCRYPTO—one enable (EN) bit, one memory address (ADDR), and one piece of data (four registers of 32 bits each). When IMCRYPTO finishes executing an instruction, it sends back a "DONE" signal to the RISC-V-based controller 44, which then fetches the next instruction.

The ten RV32I R-type customized instructions are used to trigger general-purpose bitwise and arithmetic in-memory operations, such as IMAND, IMOR, IMXOR, and IMADD, inside the CEM 41 in IMCRYPTO. These instructions are used to realize the arithmetic and logic operation inside the memory (IMXOR is also used to achieve the AddRoundKey operation of AES). As the in-memory customized R-type instructions are decoded, one enable bit (EN), two source memory addresses, and one destination memory address (ADDR) are generated. The CEM 41 operates on the two source memory addresses specified by instructions, performs the corresponding in-memory operation, and stores the result in the destination memory address. The aforementioned control signals (for both RV32I I-type and R-type instructions) are showed in FIG. 4A.

Opcodes 0000111 and 1000111 are used to differentiate the regular RISC-V instructions from our customized instructions I-type and R-type. Furthermore, as IMCRYPTO's instructions are executed inside the CEM 41, the arithmetic logic unit (ALU) and memories inside the RISC-V processor 44 can be simultaneously used to execute regular RISC-V instructions running in different threads. For example, IMCRYPTO can use one RISC-V thread to receive data. By employing this multithreaded technique, the RISC-V core acts as a controller for our IMCRYPTO accelerator, while it is also available to be used as a general-purpose processor.

By supporting different in-memory operations via the customized RISC-V R-type instructions, IMCRYPTO can achieve various modes of operation for AES without any hardware modifications. For instance, the CTR mode of AES leverages a counter value, which can be stored inside the CEM 41 of IMCRYPTO. The counter can then be implemented with the use of IMADD operations. As another example, the CBC mode of AES for processing streaming data can be achieved by an additional IMXOR operation between the output values of two consecutive AES 128-bit blocks.

In addition to the different modes of AES, IMCRYPTO can also support other block ciphers and hash algorithms, such as Blowfish, CAST-128, SHA-256, and MD5, which has similar computation operations and complexity as AES. By implementing these operations in IMCRYPTO, a high level of parallelism, high throughput, low data transfer time, and low energy consumption offered by IMC.

IV. RA/CAM Design

Figure 5A:
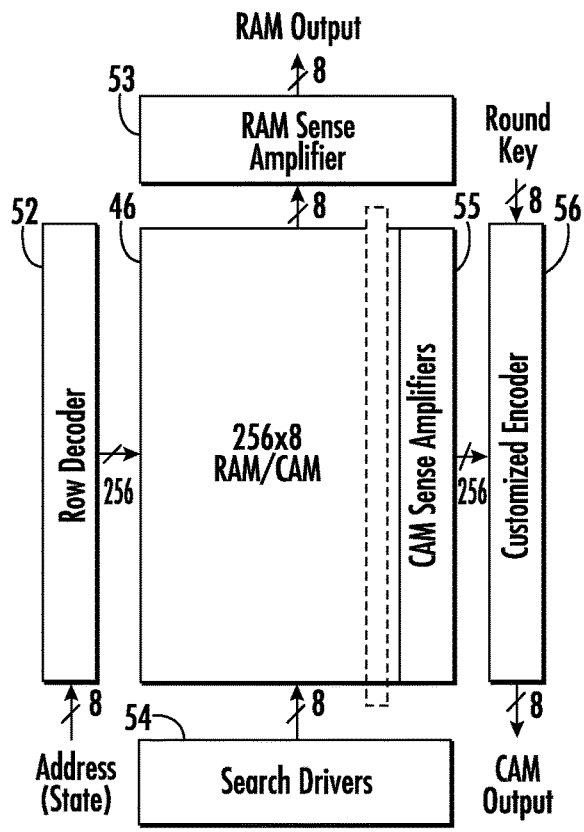
FIG. 5A is a block diagram illustrating a high level view of a dual mode Static Random Access Memory/Content Addressable Memory (RA/CAM) array in accordance with some embodiments of the present disclosure.

FIG. 5A provides a high-level view of the components of the RA/CAM circuit 46 including the 256×8 RA/CAM array 51; the row decoder circuit 52; the RAM SA 53; the search drivers 54; the CAM Sas 55; and the customized encoder circuit 56.

Our RA/CAM design is based on CMOS static RAM (SRAM) memory cells. While 6T-SRAM cells can be employed for the design of RAM modules, our RA/CAM cell design employs nine transistors. IMCRYPTO provides peripheral circuits (i.e., row decoder circuit 52 and RAM SA 53) that enables the array to work as both a RAM or a CAM (hence, a RA/CAM array is comprised of 9T-RA/CAM cells). The CAM functionality of the RA/CAM array 46 enables both the SubBytes and InvSubBytes operations to be performed with a common structure for encryption and decryption.

Figure 5B:
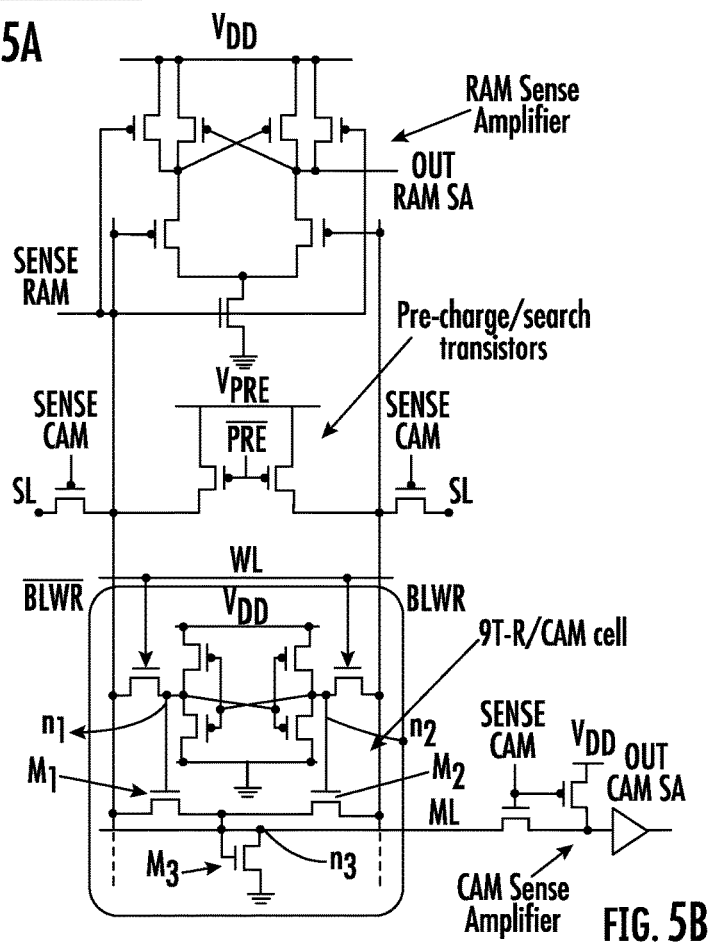
FIG. 5B is a block diagram illustrating of dual mode Static Random Access Memory/Content Addressable Memory (RA/CAM) circuit included in 1 column of the RA/CAM array of FIG. 5A in accordance with some embodiments of the present disclosure.

The schematic view of one column of the RA/CAM array 46 is shown in FIG. 5B. Although only ne 9T-RA/CAM cell and the per-column peripherals are shown in the figure, the array design includes 256 9T-RA/CAM cells connected to a common column. These memory cells share one RAM SA 53, and two precharge and two search transistors. Furthermore, the array 46 has eight columns. Memory cells in the same row and different columns share one CAM SA 55. RA/CAM has two access modes. In the following, we detail the operation of these two modes.

A. RAM Mode

Our 256×8 RA/CAM 46 array performs writes and reads in the RAM mode. The writes and reads with the 9T-RA/CAM are similar to the write and read operations with a 6T-SRAM. At the end of a write operation, the nodes $n_1$ and $n_2$ store opposite logic states. The transistors $M_1$, $M_2$, and $M_3$ are not used in the RAM mode.

B. CAM Mode

The CAM mode enables a parallel search for any byte value in the range 0x00-0xFF among the 256 bytes stored in the 256×8 RA/CAM array. The search drivers in FIG. 5A distribute the byte pattern to the eight columns of the array (through SL and SL Bar). Before a search operation, a 0-V voltage pulse is applied to BLWR and BLWR Bar to ensure that any residual voltage at the node $n_3$ is discharged [see FIG. 5B]. To initiate a search, we assert SENSE CAM=$V_{DD}$, which activates the search transistors connected to SL and SL Bar and precharges the matchline ML to $V_{DD}$.

As described in Section IV-A, after a memory cell is written, the nodes $n_1$ and $n_2$ store opposite logic states, which implies that either the transistor $M_1$ or the transistor $M_2$ is turned on during search (i.e., $M_1$ and $M_2$ are never turned on simultaneously). At this point, if the logic state stored in $n_1$ ($n_2$) is equal to the logic state applied to the SL (SL Bar), the node n3 remains discharged, and the $M_3$ transistor remains off. In this scenario, the ML is not discharged, producing a match at the output of the CAM SA (OUT CAM SA=VDD). Alternatively, if the state stored in $n_1$ ($n_2$) is the opposite of the state applied to the SL (SL Bar), there is a path from SL (SL Bar) to $n_3$ (through either $M_1$ or $M_2$), which enables the node $n_3$ to charge up and the transistor $M_3$ to turn on. In this scenario, the ML is discharged, producing a mismatch at the output of the CAM SA (i.e., OUT CAM SA=0V).

C. AES Mapping

IMCRYPTO offers advantages from a VLSI and architecture standpoints when computing AES. First, IMCRYPTO has enough flexibility to implement multiple AES modes and even other security algorithms through customized instructions on an RISC-V processor (see Section V for an example). Second, CTs can be stored inside IMCRYPTO's CEM, an encrypted LLC that enables fast access by applications. The execution of AES with IMCRYPTO is facilitated by our hardware-software codesign approach, which consists of mapping of AES operations to the proposed IMC fabric, as outlined in the next paragraphs.

IMCRYPTO realizes AddRoundKey with its CEM. The structure of the CEM, which is based on numerous tiled arrays, enables parallel computations on a wide length of data (i.e., the 128 bits of one AES block). XOR operations occur between the round key and the PT, which are temporarily stored in CEM's memory. These operations are performed with the help of customized SAs. The results of AddRoundKey are placed in latches at the output of the SAs.

IMCRYPTO realizes the byte permutations of ShiftRows/InvShiftRows with bidirectional shifters. The shift amount can be set freely between 0 and 4 bytes, in both directions, which allows flexibility for implementing AES and other cryptographic algorithms. Like with AddRoundKey, the results of ShiftRows/InvShiftRows are placed in latches at the output of the bidirectional bit shifter circuits 42.

IMCRYPTO realizes SubBytes+MixColumns and InvSubBytes+InvMixColumns through a combined operation with its LUT fabric. The advantages of combining operations in AES are reduction of delay, with a good area compromise. Like with the other operations, the results of SubBytes+MixColumns and InvSubBytes+InvMixColumns are placed in latches at the output of the LUT fabric module circuit 43.

D. Operation Combination in IMCRYPTO

To maximally exploit IMC and reduce computation cost, operations can be combination in IMCRYPTO. Specifically, we store the values of 1×sbox($a_{i,j}$) in the four RA/CAM arrays and the values of 2×sbox($a_{i,j}$) and 3×sbox($a_{i,j}$) in the eight RAM arrays 47 of one LUT fabric module circuit 43 (instead of simply storing sbox($a_{i,j}$)). These values are needed by the matrix multiplication operation in the MixColumns operation; hence, storing them directly in the RA/CAM arrays 46 enables combination of the SubByte and MixColumns operations of AES encryption. The InvSubBytes, AddRoundKey, and InvMixColumns operations of AES decryption are also executed in a combined fashion with the modification of peripheral circuits (i.e., the customized encoder) of the RA/CAM array 46.

Figure 6A:
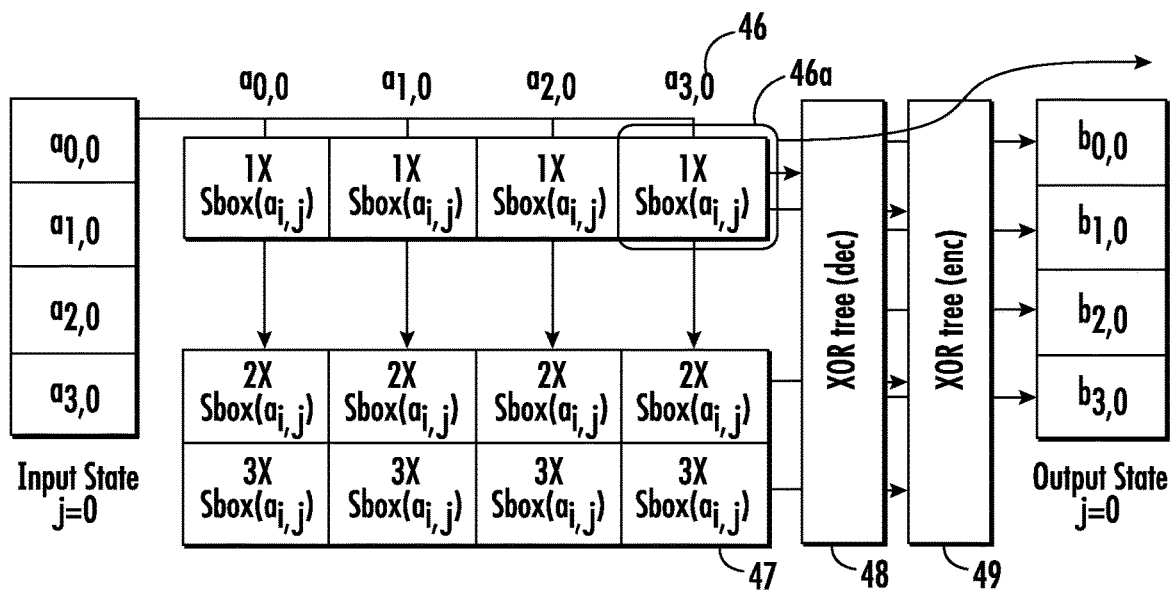
FIG. 6A is a block diagram illustrating structure and operations of an IMCRYPTO accelerator including the combined SubBytes and MixColumns operations for AES encryption in accordance with some embodiments of the present disclosure.

1) Encryption: FIG. 6A illustrates the execution of the SubBytes and MixColumns in an LUT fabric module circuit 43 with the RAM arrays 47 and RA/CAM 46 working in the RAM mode. Bytes ai, j in the same column of the input state array (i.e., bytes that have the same j index) are given as memory addresses to the row decoders of the eight RAM arrays 47 and four RA/CAM arrays 46 in a transposed fashion. In the example of FIG. 6A, we use j=0. A precomputed byte in each array is read out by the RAM SA at the given address. Once the bytes are read out from the RA/CAM arrays, they are XORed by the XOR tree to produce the result of the matrix multiplication in the MixColumns operation for the column j in the output state array.

2) Decryption: To avoid unnecessary power and delay over-heads, IMCRYPTO does not require RA/CAM arrays 46 to be reprogrammed when the accelerator switches its functionality from encryption to decryption. Therefore, during decryption, the four RA/CAM arrays 46 of one LUT fabric module circuit 43 contain the same values of encryption (i.e., 1×sbox($a_{i,j}$)). The RAM arrays 47 in the LUT fabric module circuit 43 are not used in AES decryption and can be turned off.

Figure 6B:
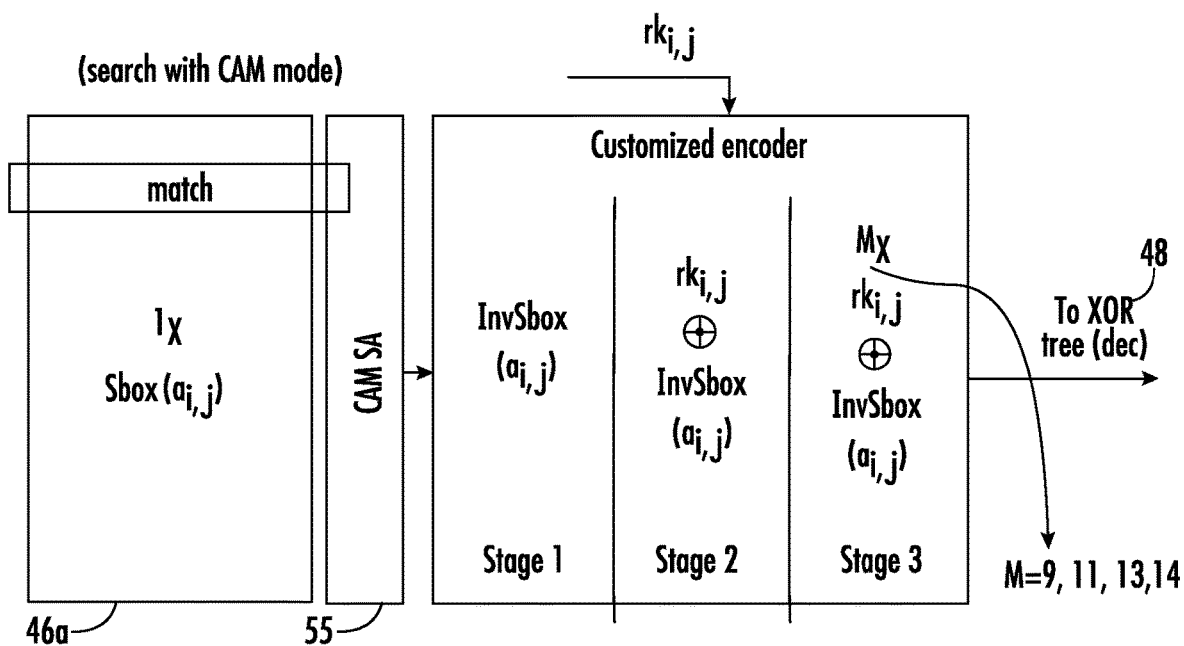
FIG. 6B is a block diagram illustrating structure and operations of an IMCRYPTO accelerator including the combined InvSubBytes, AddRoundKey, and InvMixColumns operations for AES decryption in accordance with some embodiments of the present disclosure.

FIG. 6B depicts IMCRYPTO's approach for combining operations in AES decryption. IMCRYPTO performs InvSubBytes in the periphery of the RA/CAM array 46 operating in the CAM mode (i.e., with customized encoders). Customized encoders allow the execution of InvSubBytes to be combined with AddRoundKey and InvMixColumns to enable efficient AES decryption. We divide the execution of combined operations in AES decryption with IMCRYPTO into stages. Stage 1 corresponds to the operations of InvSubBytes and leverages the invertible nature of the Sbox function to perform the SubBytes and InvSubBytes with distinct modes of a RA/CAM array 46. Stage 2 produces the result of AddRoundKey. Finally, Stage 3 computes the multiplication of InvMixColumns.

In the example of FIG. 6B, bytes $a_{i,j}$ with the same j index are given as search data to the search drivers of the four RA/CAM arrays 46 in a transposed fashion (similar to encryption). Although we illustrate only the operations in the last RA/CAM arrays 46 in our LUT fabric module circuit 43 (i.e., where the search data is $a_{3,0}$), identical operations occur simultaneously in the other columns of arrays ($a_{0,0}$, $a_{1,0}$, and $a_{2,0}$). In Stage 1 of our approach, we search for the byte $a_{3,0}$ in the RA/CAM arrays 46. The CAM SA 55 detect a single match for each array (i.e., while one row of the RA/CAM array 46 produces a match, 255 rows produce mismatches). Since the RA/CAM array 46 stores 1×sbox ($a_{i,j}$), the row which returned a match is encoded into a byte as the equivalent result of the InvSubBytes operation.

In Stage 2, the customized encoder simply performs an XOR operation between each InvSubBytes result and $rk_{0,0}$ (i.e., a byte of the round key) in order to produce the result of the AddRoundKey operation. In Stage 3, the 8-bit result of the AddRoundKey operation is multiplied by 9, 11, 13, and 14. This multiplication can be done with combinational logic inside the customized encoder that maps 1-byte value into another.

Similar to encryption, during decryption, the four 8-bit outputs of the customized encoder at Stage 3 are XORed with the other outputs of the first row of RA/CAM arrays 46 in the LUT fabric module circuit 43 (i.e., those where search data inputs were $a_{1,0}$, $a_{2,0}$, and $a_{3,0}$) with the XOR tree in stage 3. The final result, which corresponds to the output of the InvSubBytes operation, is forwarded to the next block in the AES decryption datapath.

V. Use Case of IMCRYPTO Beyond AES

The distinct security needs by various applications, in addition to the development of new operations for handling emerging attacks, make it highly desirable for crypto engines to be flexible. Furthermore, configurable crypto engines that can "guarantee interoperability between countries and institutions" are highly sought-after IP blocks. In IMCRYPTO, the use of an RISC-V coprocessor allows for basic in-memory operations to be executed in an arbitrary order, which enables support for different modes of AES and other encryption/decryption algorithms beyond AES (e.g., hashing functions and other symmetric block ciphers). In this section, we provide an example for implementing SHA-256 on our IMCRYPTO fabric.

---

Algorithm 1 SHA-256: Message Padding

Input: Initial message w
Output: Padded message w
   1: for i = 16, i < 64, i + + do -continued ---
Algorithm 1 SHA-256: Message Padding
---
2: s0 := σ0(w[i − 15]);
3: s1 := σ1(w[i − 2])
4: w[i] := (w[i − 16] + s0 + w[i − 7] + s1
5: return w ---
Algorithm 2 SHA-256: Main Hashing Function
---
Input: Padded message w, initial hashes A - H, constant k
Output: Resulting Hashes A,B,C,D,E,F,G,H
1: for i = 16, i < 64, i + + do
2: s0 := Σ0(A);
3: s1 := Σ1(E):
4: ch := Choice(E, F, G);
5: maj := Majority(A, B, C);
6: temp1 := H + s1 + ch + k[i] + w[i];
7: temp2 := s0 + maj;
8: H := G;
9: G := F;
10: F := E;
11: E := D + temp1;
12: D := C;
13: C := B;
14: B := A;
15: A := temp1 + temp2;
16: return A,B,C,D,E,F,G,H SHA-256 is a member of SHA-2—a group of cryptographic hash functions designed by the National Security Agency (NSA). Widely known for its high security and speed, SHA-256 is used in the block chain industry and encryption communication protocols. The SHA-256 algorithm can be divided into two parts: message padding (see Algorithm 1) and main hashing function (see Algorithm 2). While the former extends a 16-bit word message to a 64-bit word message, the latter generates fixed-sized outputs (i.e., hashes). Message padding uses the σ0 and σ1 functions for padding (lines 2 and 3 in Algorithm 1). σ0 and σ1 are implemented with bitwise "right-rotate" and "right-shift" operations, as defined in the following:

$$\sigma_0(A)=(A>>>7)\oplus(A>>>18)\oplus(A>>3)$$

$$\sigma_1(A)=(A>>>17)\oplus(A>>>19)\oplus(A>>10).$$

Figure 7A:
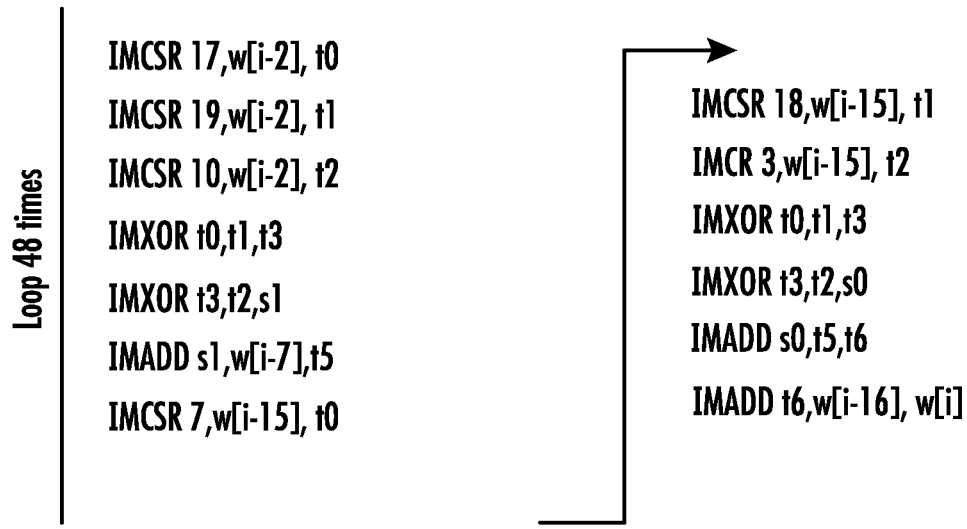
FIG. 7A illustrates translation of SHA-256 message padding in accordance with some embodiments of the present disclosure.
Figure 7B:
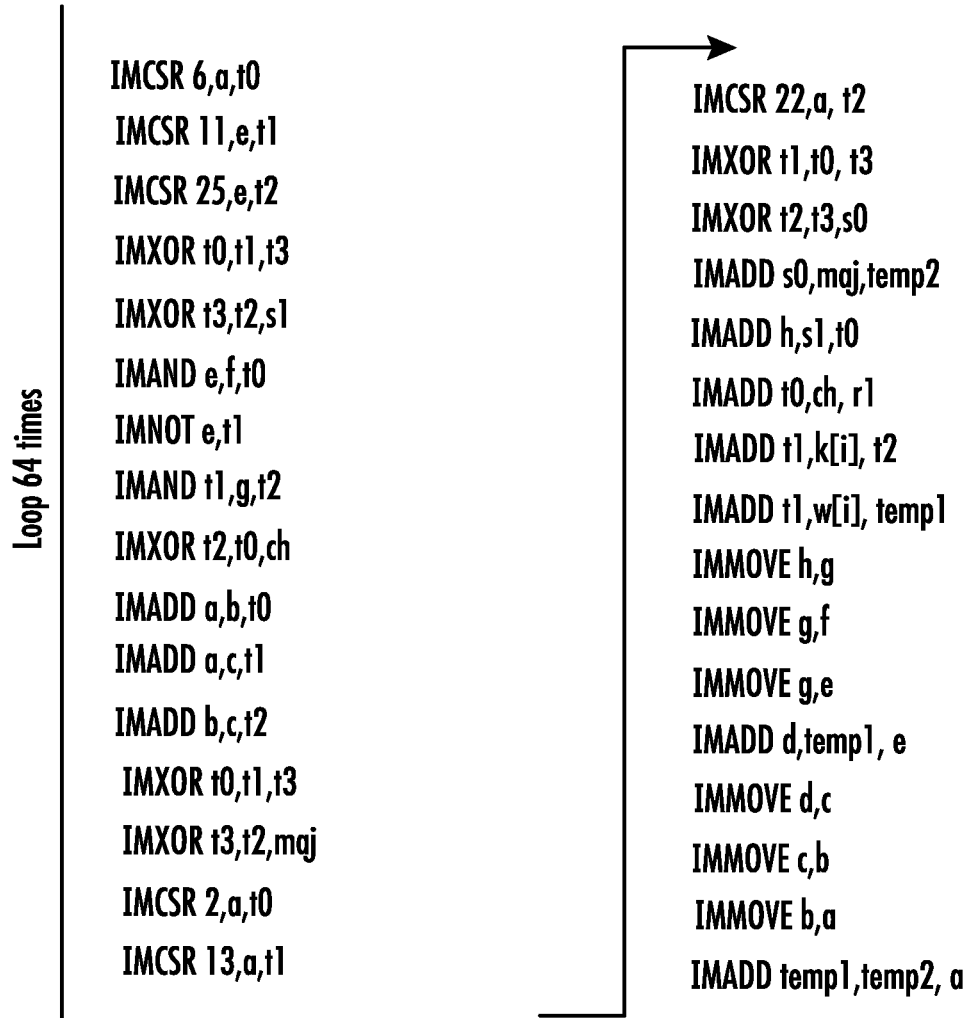
FIG. 7B illustrates translation of main hashing function into customized instructions in accordance with some embodiments of the present disclosure.
Figures 8A, 8B, 8C, 8D, 8E, 8F:
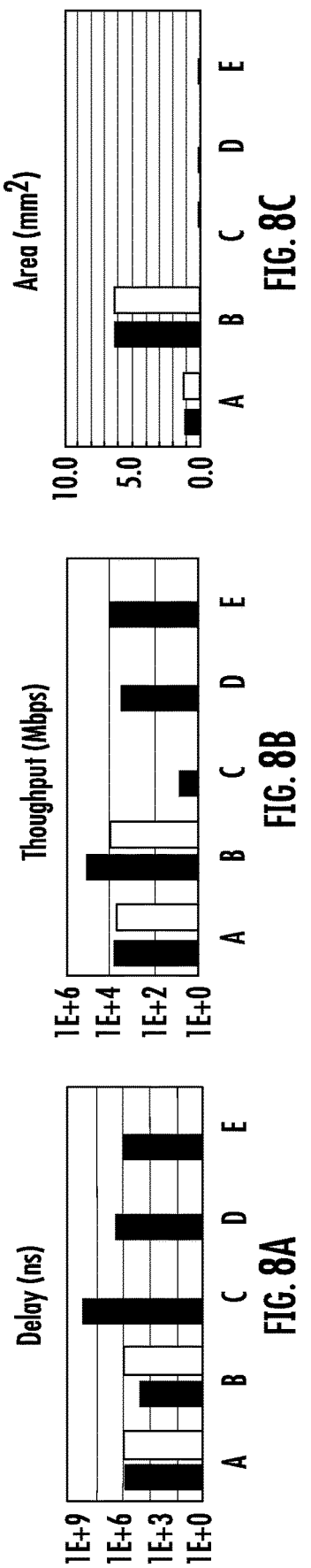
FIG. 8A-8F are graphs illustrating delay, throughput, area, power, throughput per area, and area-delay-power product (ADPP) of AES-128 encryption, respectively comparing the AES accelerators listed in Table II, wherein the filled bars do not include the latency and energy overhead of data transfers to/from a memory unit for the ASIC-based accelerators for designs A and B and wherein the empty bars do include the latency and energy overhead of data transfers to/from a memory unit for the ASIC-based accelerators for designs A and B in accordance with some embodiments of the present disclosure.

IMCRYPTO uses the customized instructions IMCSL, IMCSR, IMSR, IMXOR, and IMADD to perform message padding [see FIG. 7A]. For instance, to implement rotations inside IMCRYPTO, the data are accessed through their memory addresses. Then, these data are read through the customized SA of the CEM 41 and sent to hardware blocks that implement in-memory bit shifters. Fixed shift amounts are used with the bit shifters in order to slide the data bits to specific positions as required by the rotation operation.

The main hashing function (see Algorithm 2) is executed after message padding and produces the final output (i.e., a set of 8, fixed-sized hashes). The main hashing function in SHA-256 takes 64 rounds to complete its execution. It is comprised of two functions—"majority" and "choice"

$$\text{Majority}(A,B,C)=A\cdot B\oplus A\cdot C\oplus B\cdot C$$

$$\text{Choice}(A,B,C):=A\cdot B\oplus A\text{ Bar} C.$$

Each of these functions takes three inputs A, B, and C, and performs computation as follows: 1) the "majority" function outputs "0" ("1") when half or more of its inputs are "0" ("1") and 2) the "choice" function uses input A as a selector bit, i.e., when A="1" ("0"), the function outputs the value of 'B' ('C'). The main hashing function uses the $\Sigma_0$ and $\Sigma_1$ functions to hash the data, which can be implemented with bitwise "right-rotate" operations $$\Sigma_0(A)=(A>>>2)\oplus(A>>>13)\oplus(A>>>22)$$

$$\Sigma_1(A)=(A>>>6)\oplus(A>>>11)\oplus(A>>>25).$$

Besides these functions, 64 constants+8 initial hashes (A-H) are needed. IMCRYPTO prestores these constants and the initial hashes inside the CEM and uses the customized instructions, IMCSR, IMXOR, IMAND, IMOR, IMNOT, IMADD, and IMMOVE [see Table I B], to perform the operations in the main hashing function.

VI. Experimental Evaluation

Here, we compare figures of merit (FoMs) (i.e., delay, throughput, area, power, throughput per area, and ADPP) of IMCRYPTO with accelerators for AES encryption/decryption from previous works.

A. Experimental Setup

In our evaluation (and comparison), we implement AES-128 encryption (ECB mode). The implementation of the IMCRYPTO instructions in the RISC-V-based controller and their sequencing for AES-128 ECB mode is done in Verilog and evaluated through register transfer level (RTL) simulations. At the circuit level, we use the DESTINY simulator to measure area, latency, and energy for a 1-MB compute-enabled SRAM with a two-mat organization and a subarray size of 128×128. We have modified DESTINY to support the customized SAs and local write buffers. The compute-enabled SRAM is based on a 45-nm CMOS predictive technology model (PTM). We choose the 45-nm technology node as most designs in our comparison use this node. To estimate the area overhead introduced by compute circuits in the SRAM, we subtract the area of a baseline SRAM of 1 MB based on the same technology node from the area of the compute-enabled RAM. We use DESTINY to simulate the baseline SRAM, which is a regular SRAM memory without customized peripherals. The results indicate an area overhead of 6.9% for the SRAM due to the addition of the compute circuits, which is compatible with the 6.0% area overhead.

The area, latency, and energy of the bidirectional shifter block are measured through synthesis using the Cadence Encounter RTL Compiler v14.10 with the NanGate 45-nm open-cell library. Finally, the 256×8 RA/CAM arrays in IMCRYPTO's LUT fabric [block 4 of FIG. 4A] are simulated using HSPICE version O-2018.09-1 with the PTM for 45-nm CMOS and $V_{DD}$=1 V. We measure the latency and energy for the different types of memory accesses, i.e., reads/writes in RAM mode and searches in the CAM mode. In order to estimate the area of the 256×8 RA/CAM array, we employ the OpenRAM memory compiler, in which we specify the 6T-SRAM and 9T-RA/CAM cells, as well as the peripherals of our design. The area of the IMCRYPTO fabric (which we compare with the area of other accelerators in Section VI-C) includes the area overhead of compute-enabled SRAM, the area of the bidirectional shifter, and the area of all circuits in the LUT fabric.

After Verilog synthesis and SPICE simulations, we carefully check the log files (i.e., simulation reports) for implementation issues, such as inferred latches, outputs without external loads, and nets with multiple drivers. Furthermore, in our evaluation, we test multiple input values (i.e., for the encryption of 1 byte, all possible cases, 0 to 255, are simulated) to make sure we get good coverage in our tests.

B. Frequency of Operation

When performing one round of AES-128 encryption for a 128-bit block of PT, the latency of the IMCRYPTO blocks labeled 1-4 in FIG. 4A is given as follows.

1) Block 1 (CEM): It executes the XOR operation for the AddRoundKey operation of encryption/decryption inside the 1-MB CEM in under 870 ps.
2) Block 2 (Bidirectional Shifter): It executes the byte permutation operation for the ShiftRows/InvShiftRows operations of encryption/decryption in under 100 ps.
3) Block 3 (LUT Fabric): It executes the lookups and XOR operations needed in Galois field matrix multiplications for the combined SubBytes+Mixcolumns/InvSubBytes+InvMixcolumns operations in under 780 ps.
4) Block 4 (RISC-V-Based Controller): It adds no more than 100 ps to each encryption/decryption operation to fetch and decode the customized instructions that are executed with IMCRYPTO's circuits in blocks 1-3.

Considering the latencies outlined above, the worst case scenario latency with IMCRYPTO is the latency of the CEM (870 ps for in-memory operation+100 ps for instruction decoding and fetching). Hence, we have chosen the operation frequency of 1 GHz, which is adopted throughout our evaluation. Furthermore, we take advantage of IMCRYPTO's modular structure to pipeline instructions through block 1 (mats 0 and 1), block 2, and block 3 of the architecture in order to achieve higher throughput.

C. Quantitative Analysis With Different FoMs

Table II summarizes other accelerators for AES compared to IMCRYPTO (design E). Designs A and B are ASIC accelerators for AES based on a 45-nm CMOS technology node. Designs C-E are based on the IMC concept and consist of CEM arrays integrated with customized circuitry that compute at the memory periphery. While designs C and E are based on 40- and 45-nm CMOS technologies, respectively, design D is based on a 65-nm PCM technology. Designs B and C support other algorithms/functions besides AES encryption. AES decryption is possible with designs A, D, and E.

TABLE II

| Design | Type | Technology Node | Supported Algorithms |
|---|---|---|---|
| A | ASIC | CMOS 45 mm | AES encryption/decryption |
| B | ASIC | CMOS 45 nm | AES encryption + Most symmetric ciphers |
| C | IMC | CMOS 40 nm | AES encryption, Keccak, finite field multiply |
| D | IMC | PCM 65 nm | AES encryption/decryption |
| E | IMC | CMOS 45 nm | AES encryption/decryption* |

FIGS. 8A-F and 9A and B present and compare different FoMs for designs A-E for AES-128 encryption. While FIG. 8A-F presents the raw data for all FoM in separate bar graphs, FIGS. 9A and B enables us to collectively compare the different designs in terms of all FoM evaluated. This comprehensive presentation of several FoMs favors the study of throughput—area tradeoffs, energy efficiency, and so on. Different use cases may favor different FoM, which may serve to distinct design objectives depending on the application. For instance, if IMCRYPTO is used for accelerating AES encryption/decryption in a resource-constrained environment (i.e., an embedded system), then a balance between throughput and area with low power consumption is essential. In this regard, the presented FoM should be analyzed collectively, so the benefit can be better understood under different circumstances.

The scores for the FoM presented are delay in ns (measures the time for encrypting 1 MB of data), throughput in Mb/s (measures the volume of data that can be encrypted in 1 s), area in $mm^2$ (corresponds to the silicon area occupied by the accelerator), and power in µW (corresponds to total static and dynamic power of the design during encryption). In addition, we also present derived scores. Such as throughput per area, defined as the ratio between the throughput of the accelerator and the silicon area occupied by the design. Another derived metric is the ADPP, which is defined as the multiplication between the design area, the delay for encrypting 1 MB of data, and the power of the design. FoM scores (i.e., improvements) are calculated.

Figure 9A:
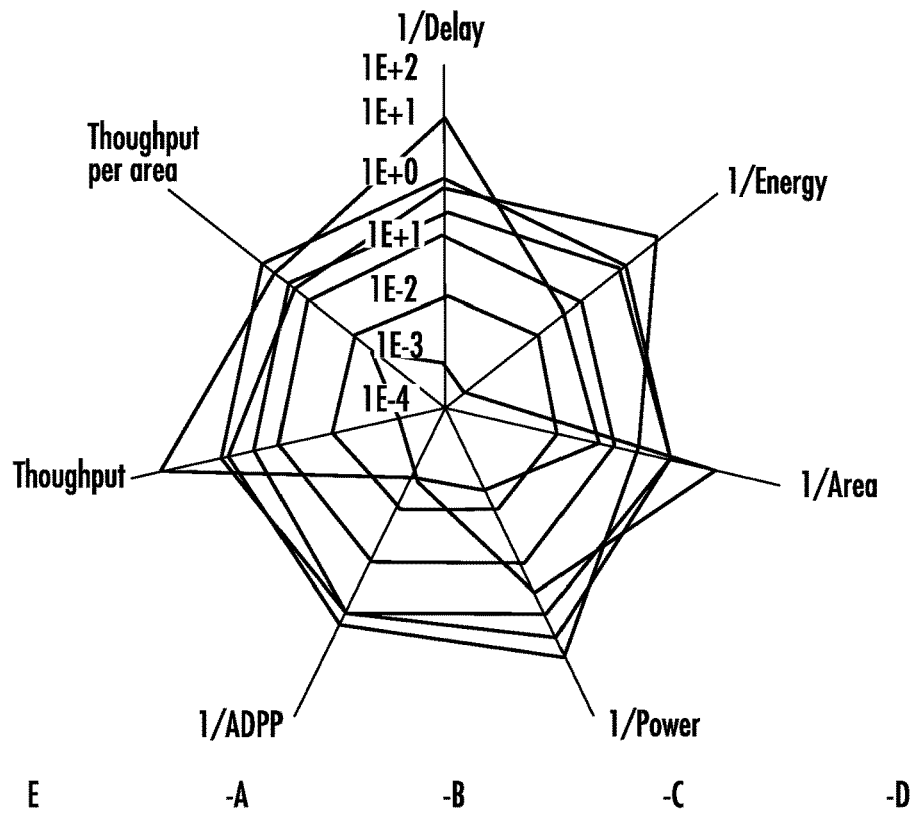
FIG. 9A is a plot that illustrates comparison between designs A-E for 7 different FoM without the overhead of data transfers in accordance with some embodiments of the present disclosure.
Figure 9B:
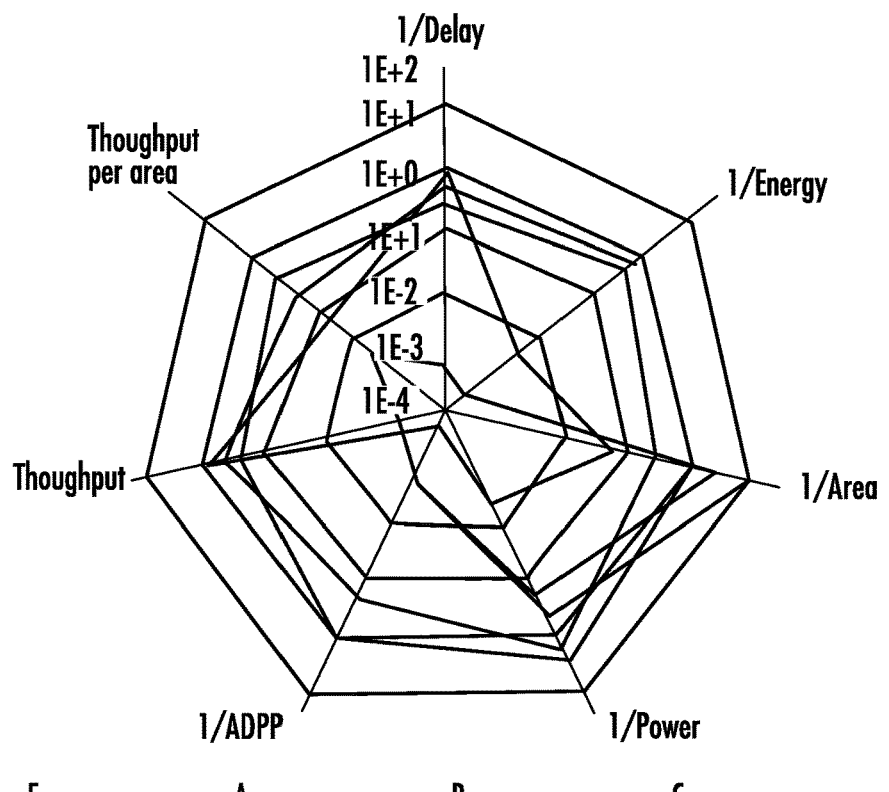
FIG. 9B is a plot that illustrates comparison between designs A-E for 7 different FoM with the overhead of data transfers in accordance with some embodiments of the present disclosure.

Two sets of data are considered. The filled bars in FIG. 8A-F [lines in FIG. 9A] do not include the latency and energy of data transfers to/from a memory unit for the two ASIC-based accelerators (designs A and B). The FoM comparison in FIG. 9 are normalized to IMCRYPTO. This normalization is computed as the inverse of the ratio between delay, energy, area, power, and ADPP metrics for design A, B, C, or D, and the same metrics for design E (IMCRYPTO). Note that, in the case of throughput and throughput per area, the ratio does not require inversion for better visualization of the benefits when put close to the other metrics.

Note that designs C-E are based on the IMC paradigm, which allows computation to be performed inside (or near) the memory without the need for data transfers. The second set of data [hollow bars in FIG. 8A-F/lines in FIG. 9B] adds 744.49-µs latency (30.39-µJ energy) from memory transfers to the latency (energy) of designs A and B. This additional latency/energy is spent on transferring 1 MB of PT from a 1-MB SRAM to each ASIC accelerator and writing back the resulting 1 MB of CT to the same 1-MB SRAM. DESTINY is used to estimate the latency and energy overheads of such data transfers.

We first consider delay and throughput when data transfers are not accounted for in designs A and B (i.e., the ASIC-based accelerators). In this scenario, design B has the shortest delay to encrypt 1 MB of data and the highest throughput among all designs evaluated [see FIGS. 8A and B]. IMCRYPTO has the highest throughput per area [see FIG. 8E] among all designs in our study. Compared to designs A-D, design E enables minimum improvements in throughput per area of ~5.0×, ~1.9×, ~223.1×, and ~3.3×, respectively.

When we include the overhead of data transfers for the ASIC-type accelerators in our analysis, design E has the shortest delay and highest throughput among all designs. Namely, compared to design B, design E is 1.2× better with respect to both delay and throughput. Importantly, fast and high throughput AES-128 encryption in IMCRYPTO (design E) comes with an improvement of 19.7× in terms of area [see FIG. 8C] and 257.7× in terms of power [see FIG. 8D] compared to design B. Finally, when we account for data transfers, design E outperforms design B by a factor of 5.7× in terms of ADPP [see FIG. 8F].

Note that, in terms of the ADPP metric, design A would be the best-in-class design when data transfers for ASIC-based designs are excluded from the evaluation. In the setup where data transfers are included in the total delay and energy results, the second-best design in terms of ADPP is design D, an architecture also based on IMC. Unlike design E (which is based on CMOS), design D employs PCM and bank-level parallelism in its CEM. Design E slightly improves the ADPP by a factor of 1.2× compared to design D, which is associated with the two designs occupying roughly the same area, with design E having a 4.0× shorter delay and higher power consumption (0.3×). Some of the benefits of design D are derived from the use of PCM. In fact, IMCRYPTO can also benefit from alternative memory technologies that we discuss next.

D. FoM Projection Based on Emerging Technologies

Figure 10:
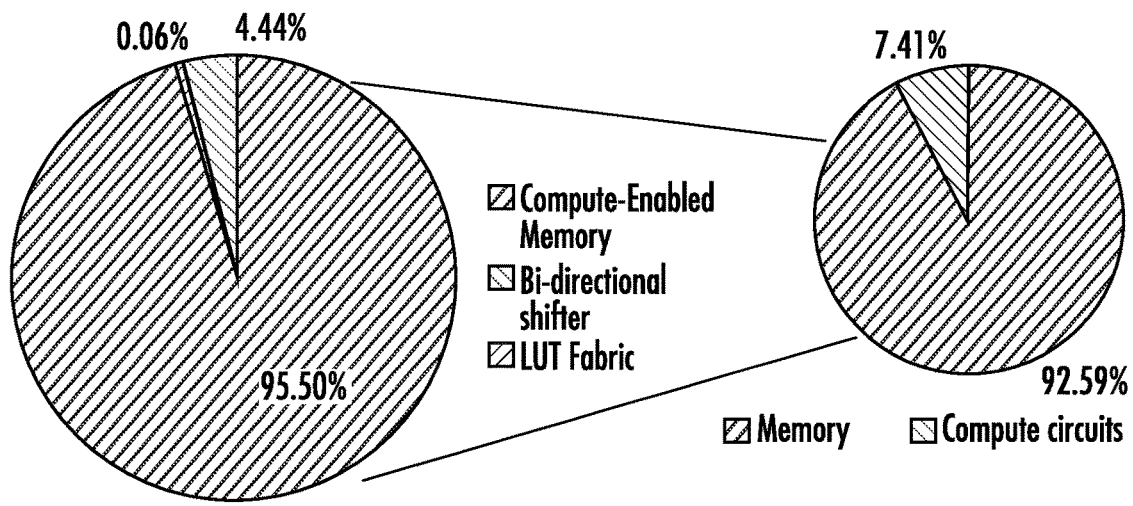
FIG. 10 is a chart that illustrates area breakdown of an IMCRYPTO fabric based on a 1 MB CEM showing that memory components can dominate the overall area of the proposed accelerator in accordance with some embodiments of the present disclosure.

Per FIG. 10, the CEM and the LUT fabric modules of IMCRYPTO are responsible for >99.9% of the total area of our proposed AES encryption/decryption IMC accelerator. As discussed in Section III, these two blocks of IMCRYPTO are built with CMOS 6T-SRAM and 9T-RA/CAM cells. Here, we investigate whether the use of memories based on emerging technologies, such as PCM, RRAM, STT-MRAM, and FeFETs, to replace CMOS-based memories could result in additional benefits to our proposed IMCRYPTO approach.

Emerging technologies could potentially improve the density of memories by factors of 1×-25×. Furthermore, the read power of memories based on most emerging technologies may be comparable to that of CMOS SRAM with static power savings due to nonvolatility [9]. Despite these advantages, one of the downsides of emerging technologies is their long read and write latencies (up to 10× of CMOS SRAM), which may increase the clock cycle time and reduce the frequency of operation of IMC accelerators, such as IMCRYPTO. To analyze the impact of emerging technologies on the ADPP of IMCRYPTO, we study the tradeoff between longer cycle times (thus lower operating frequencies) and density improvements enabled by emerging technologies with respect to CMOS SRAM (see FIG. 11).

Figure 11:
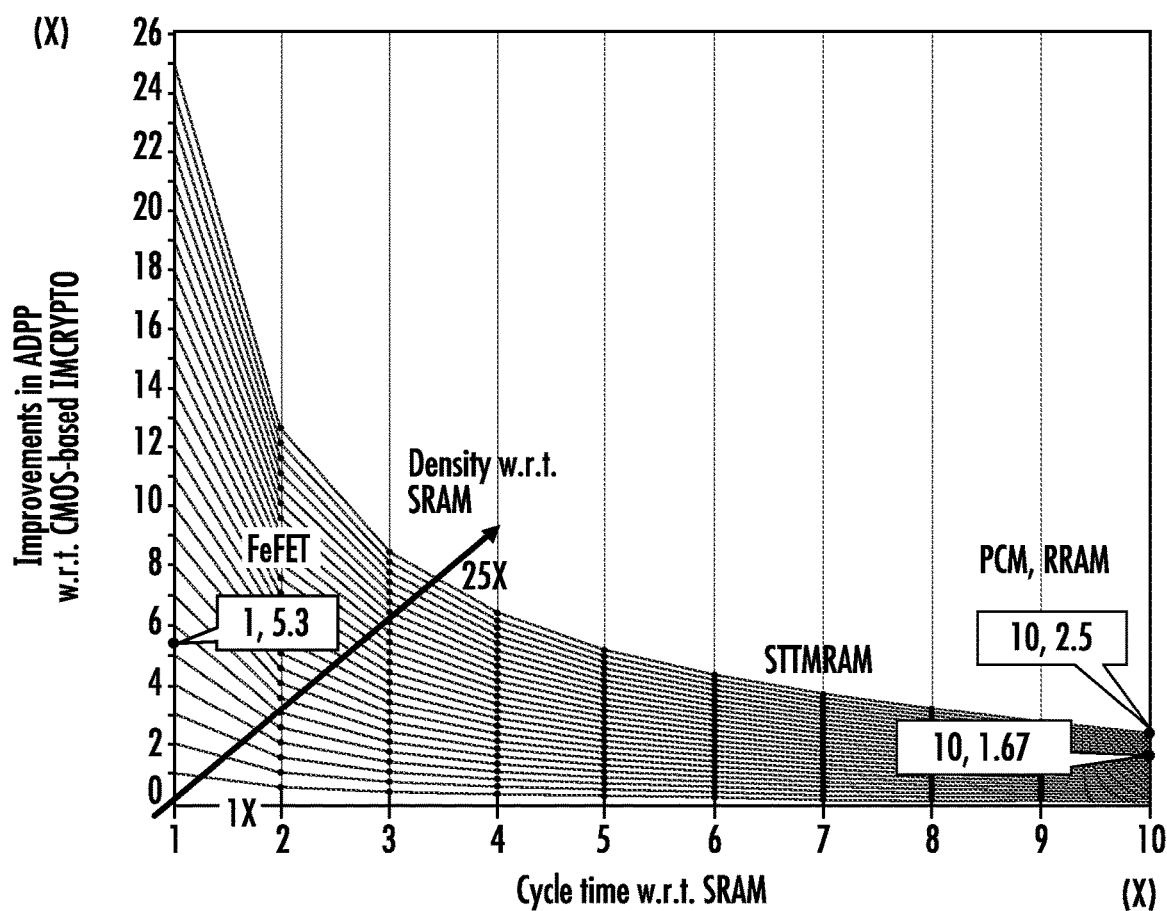
FIG. 11 is a graph that illustrates projected improvements in ADPP with respect to pCMOS-based IMCRYPTO for memories based on emerging technologies in accordance with some embodiments of the present disclosure.

In our projection, we consider the read power of emerging technologies to be on par with that of CMOS SRAM. The green curves in the FIG. 11 represent different memory densities (1×-25× compared to SRAM). Given cycle times that are up to 10× longer than those of conventional SRAM (x-axis), improvements in ADPP with respect to CMOS-based IMCRYPTO (y-axis) are captured. From the data points depicted in FIG. 11, we project that current state-of-the-art memory technologies improve the ADPP of IMCRYPTO by 1.7×-5.3×. For instance, by implementing a PCM-based IMCRYPTO, we project 2.5× benefits in ADPP relative to a CMOS-based IMCRYPTO (design E in Table II). As CMOS-based IMCRYPTO's ADPP slightly outperforms PCM-based design D by a factor of 1.2×, when we compare the two designs implemented with the same technology, we expect design E to outperform design D in terms of ADPP by a factor of 3.0×.

E. Side-Channel Attack Analysis

The communication between a traditional CPU and a coprocessor (hardware accelerator) for AES encryption/decryption may be vulnerable to time and power side-channel attacks. For the former, we note that, although faster, it is a well-known fact that table-based implementations of Sbox are vulnerable to cache timing attacks in software implementations that run on a traditional CPU architecture. Nevertheless, table-based implementations of Sbox are well-suited for FPGA- or ASIC-based accelerator designs, which does not employ caches in their construction. IMCRYPTO employs an LUT fabric comprised of static RA/CAM and 6T-SRAM arrays that store precomputed values for the combined SubBytes and MixColumns operations [see FIG. 4B]. These precomputed values are not fetched from a cache structure, and once stored in the LUT fabric, the tables remain unchanged through the execution of the whole AES. Importantly, the access time of RA/CAM (and 6T-SRAM) arrays in the LUT fabric [see FIG. 4B] does not show any data dependency pattern, which makes IMCRYPTO resilient to cache timing attacks (such as FPGA- and ASIC-based accelerator designs).

We next discuss the tolerance of IMCRYPTO to correlation power analysis (CPA) attacks. To this end, our ongoing work is investigating the resistance of LUT fabric in IMCRYPTO against power analysis attacks that target the correlation between the total power consumption of the hardware and the secret keys. The LUT fabric of IMCRYPTO can potentially provide resistance to power analysis attacks due to the symmetric design of RA/CAM cells that store complementary bits in their cross-coupled inverters. In our preliminary experiments, we have observed that the difference between power consumption from reading different values from the RA/CAM (i.e., loading 1 or loading 0) is extremely small, which makes it hard to find the correlation between the input of the RA/CAM array and power consumption. Due to the variety of existing power side-channel attacks, and the complexity of analysis and experiments needed to verify the resistance of the whole IMCRYPTO architecture against power analysis attacks, we leave reporting this part of the findings to future work.

Terminology

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that the methods/operations described herein may be performed in any sequence and/or in any combination, and the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or operations. Thus, such conditional language is not generally intended to imply that features, elements and/or operations are in any way required for one or more embodiments or that one or more embodiments necessarily include logic for deciding, with or without user input or prompting, whether these features, elements and/or operations are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed:

1. A secure system configured to perform cryptographic operations on digital data, the secure system comprising:
    a plurality of look-up-table fabric modules, each look-up-table fabric module comprising a plurality of memory elements including at least one memory device operable in a random access mode and a content addressable mode, each look-up-table fabric module operatively coupled to a respective portion of an input data structure; and
    a processor circuit operatively coupled to the plurality of look-up-table fabric modules, the processor circuit configured to:
        receive the input data structure, wherein the input data structure comprises a plurality of data segments for distributed processing by the plurality of look-up-table fabric modules;
        provide the plurality of data segments to the plurality of look-up-table fabric modules for local cryptographic encryption operations, wherein the at least one memory devices of each look-up-table fabric module operates in the random access mode to retrieve precomputed values for cryptographic transformations, and
        provide encrypted versions of the plurality of data segments to the plurality of look-up-table fabric modules for local cryptographic decryption using the memory devices operating in the content addressable mode to perform inverse transformation matching.

2. The secure system of claim 1, wherein each of the plurality of look-up-table fabric modules comprises a plurality of columns of memory devices, each memory device of the memory devices including a plurality of static random access memory devices and a dual-mode memory device configured to operate as a Random Access Memory in encryption mode and configured to operate as a Content Addressable Memory in decryption mode responsive to the processor circuit.

3. The secure system of claim 2, wherein each of the plurality of columns of memory devices includes one dual mode memory device and two static random access memory devices.

4. The secure system of claim 1, wherein a number of look-up-table fabric modules is equal to a number of data segments.

5. The secure system of claim 1, wherein the plurality of look-up-table fabric modules are configured to provide a cache memory operatively coupled to a level 2 cache memory outside a main memory bus for the processor circuit.

6. The secure system of claim 1 further comprising:
a computer enabled memory operatively coupled to the processor circuit, the computer enabled memory configured to store unencrypted data for encryption and configured to store encrypted data output from the plurality of look-up-table fabric modules, the computer enabled memory further configured to provide XOR operations to add a RoundKey to the unencrypted data;
a bidirectional shifter circuit coupled to an output buffer of the computer enabled memory and coupled to inputs of the plurality of look-up-table fabric modules, the bidirectional shifter circuit configured to shift data in a first direction to provide a ShiftRows encryption operation and configured to shift data in a second direction to provide an InvShiftRows decryption operation; and
a LUT output buffer coupled to an output of the plurality of look-up-table fabric modules.

7. The secure system of claim 1, wherein the processor circuit programmatically operates responsive to an instruction set configured to operate the plurality of look-up-table fabric modules to perform encryption operations and decryption operations.

8. The secure system of claim 1, wherein the processor circuit programmatically operates responsive to an instruction set to perform AES encryption/decryption operations, Blowfish encryption/decryption operations, CAST-128 encryption/decryption operations, SHA-256 encryption/decryption operations, and/or MD5 encryption/decryption operations.

9. The secure system of claim 1, wherein the processor circuit is configured to execute a customized instruction set comprising R-type and I-type instructions to perform in-memory cryptographic operations corresponding to a plurality of algorithms including block ciphers and hashing functions.

10. The secure system of claim 1, wherein the look-up-table fabric modules are configured to perform combined cryptographic operations comprising both substitution and matrix transformation within a single memory access cycle.

11. The secure system of claim 1, further comprising a compute-enabled memory comprising a plurality of static random access memory cells and customized sense amplifiers configured to perform XOR operations between memory-resident words during an AddRoundKey operation.

12. The secure system of claim 1, further comprising a bidirectional shifter circuit operatively coupled to the look-up-table fabric modules and configured to apply byte-wise shifts in opposing directions to implement ShiftRows and InvShiftRows operations.

13. The secure system of claim 1, wherein the at least one memory device of each look-up-table fabric modules comprises one or more of static random access memory, resistive random access memory, spin-transfer torque magnetic random access memory, phase-change memory, or ferroelectric random access memory.

14. The secure system of claim 2, wherein the input data structure comprises an input state data matrix, wherein the plurality of columns of memory devices comprise:
a plurality of first memory devices coupled in parallel to provide a first look-up-table configured to store pre-computed products of a plurality of multipliers with all possible data values used to access the plurality of first memory devices provided by first data included in a first column of the plurality of columns of the input state data matrix;
a plurality of second memory devices coupled in parallel to provide a second look-up-table configured to store pre-computed products of the plurality of multipliers with all possible data values used to access the plurality of second memory devices provided by second data included in the first column of the input state data matrix;
a plurality of third memory devices coupled in parallel to provide a third look-up-table configured to store pre-computed products of the plurality of multipliers with all possible data values used to access the plurality of third memory devices provided by third data included in the first column of the input state data matrix; and
a plurality of fourth memory devices coupled in parallel to provide a fourth look-up-table configured to store pre-computed products of the plurality of multipliers with all possible data values used to access the plurality of fourth memory devices provided by fourth data included in the first column of the input state data matrix.

15. The secure system of claim 14, further comprising:
an encryption XOR combinatorial logic circuit coupled to outputs of SRAM sense amplifier circuits included in each respective dual mode memory device and outputs of SRAM sense amplifier circuits included in each respective Random Access Memory; and
a decryption XOR combinatorial logic circuit coupled to outputs of Content Addressable Memory sense amplifier in each respective dual mode memory device.

16. The secure system of claim 15, wherein the plurality of N look-up-table fabric modules and the encryption XOR combinatorial logic circuit are configured to combine encryption operations including SubBytes, MixColumns, and AddRoundKey; and
wherein the plurality of look-up-table fabric modules and the decryption XOR combinatorial logic circuit are configured to combine decryption operations including InvSubBytes, InvMixColumns, and AddRoundKey.

17. The secure system of claim 16, wherein the decryption XOR combinatorial logic circuit is configured as an encoder circuit.

* * * * *